United States Patent [19]

MacGregor

[11] 4,302,883
[45] Dec. 1, 1981

[54] VEHICLE FRAME, BODY AND WHEEL ALIGNMENT GAUGE

[75] Inventor: Paul E. MacGregor, Guilford, Conn.

[73] Assignee: Exacto-Mac Limited Partnership, Madison, Conn.

[21] Appl. No.: 103,164

[22] Filed: Dec. 13, 1979

[51] Int. Cl.³ ............................................. G01B 5/255
[52] U.S. Cl. ............................. 33/180 AT; 33/174 L; 33/203; 33/288
[58] Field of Search .................. 33/203, 203.18, 203.2, 33/203.15, 227, 180 AT, 181 AT, 288, 174 G, 174 P, 174 PA, 174 L

[56] References Cited

U.S. PATENT DOCUMENTS 3,762,056 10/1973 Wolfe ............................ 33/174 PA
3,805,396 4/1974 Hunnicutt ...................... 33/180 AT
3,869,804 3/1975 Friend .................................. 33/288
4,015,338 4/1977 Kunze et al. ................. 33/203.18 X
4,098,003 7/1978 Negrin .................................. 33/288

*Primary Examiner*—William D. Martin, Jr.
*Attorney, Agent, or Firm*—Craig and Antonelli

[57] ABSTRACT

A vehicle alignment gauge has a controlling member affixed to the rocker panel of a damaged vehicle to define a reference for measurements of frame, body and wheel damage relative to the central portion of the vehicle and a U-shaped rotatable measuring member rotatively coupled to the controlling member. The rotatable measuring member may be angularly adjusted so as to define an external datum plane from which dimensional measurements of the front, back, sides, upper and lower surfaces of the vehicle may be made.

24 Claims, 3 Drawing Figures

VEHICLE FRAME, BODY AND WHEEL ALIGNMENT GAUGE

BACKGROUND OF THE INVENTION

The present invention relates to gauges for detecting and analyzing damage to vehicles.

With the increased use of highways by vehicles, the number of collisions between vehicles or between vehicles and objects has increased greatly. Frequently in such collisions, it is not only the vehicle body that is mangled and twisted, but also the frame member or chassis on which the vehicle body is supported. At times, the only damage done to an automobile is noticeable and obvious, such as damage done to the fender, bumper, grill and headlight. However, if the frame of the vehicle has been damaged by the collision, the effect of such damage is not easily noticed or corrected. Different types of collisions produce different types of damage to the chassis of a vehicle. For example, a collision that results in one vehicle being hit broadside by another will, in most instances, result in the mid-portion of the frame or chassis between front and rear wheels being pushed inwardly toward the opposite frame member. On the other hand, collisions in which the front or rear corners of the frame receives the impact of the collision will frequently result in the frame being wrenched out of alignment so that the front and rear wheels do not track. Obviously, some collisions result in both types of damage to the chassis, the chassis being bent and twisted simultaneously. If frame member damage is not detected and repaired, chronic problems with steering, front end wear or even rear end wear will result. In addition, damage is difficult to pinpoint in vehicles built with unit body construction which is deemed to be a predominant type of construction in the future. Further, many collisions cause altering of the mounting positions for the front suspension units.

Several known methods exist for detecting the damage done to a vehicle which has been involved in a collision. These methods usually make some form of comparing a damaged portion of the vehicle to a supposedly undamaged, symmetrical portion of the vehicle. This comparison requires not only exact dimensioning, but also diagnostic decision making. Once the damage is detected, various straightening or pulling procedures are enacted. Many auto body personnel treat the actual physical act of pulling damage as the primary effort in body repair and fail to properly and completely analyze the damaged vehicle. Correct analysis is essential and must be done before pulling starts. To repair a damaged vehicle properly, the damage must be pulled out simultaneously and exactly in reverse to the manner in which the damage was inflicted.

In one known method for detecting damage to an automobile, the vehicle is usually inspected where, without the use of any tools, a visual comparison between a damaged and a supposed undamaged portion of the vehicle is made. In another method known as reference dimensioning, actual measurements are taken from the undamaged portions of the vehicle. These measurements are then used to determine the correct position for identical, damaged portions. However, if the damage is not localized, these procedures result in improper repair due to distortion at the starting reference of the vehicle.

Various types of frame gauges are also known. These gauges permit measurement of the vertical distance of various parts of the undersurface of a vehicle from a reference horizontal plane, a datum plane, located beneath the vehicle. These measurements may be compared with reference values in body frame dimension figures made available by automobile manufacturers. An exemplary frame gauge is described in U.S. Pat. No. 3,869,804. However, these frame gauges do not permit analysis of other portions of a damaged vehicle such as the front, back, side and upper surfaces.

SUMMARY OF THE INVENTION

An object of the invention is to provide an economical tool with which to accurately identify, estimate and repair vehicle body damage from an external reference datum plane.

Another object of the invention is to provide a gauge capable of easily detecting the extent of damage to the frame or body of a vehicle at its center region.

Still another object is to provide a gauge capable of accurately measuring damage to the front, back, upper and side surfaces of a vehicle in an uncomplicated manner.

According to the present invention, there is provided an alignment gauge for a vehicle having a controlling member with a length greater than the width of the center portion of the vehicle. Devices are provided for securing the controlling member to the underside of the vehicle so that the ends of the controlling member extend beyond the sides of the vehicle. A rotatable measuring member has a pair of parallel side arms and has a transverse arm coupled to and extending between one end of the side arms, the transverse arm having a length at least equal to the width of the vehicle. A device is provided for rotatively coupling the open ends of the side arms of the rotatable measuring member to the ends of the controlling member so that the rotatable measuring member may form a rotatable datum plane intersecting the center region of the vehicle at a plurality of angles. The plane forms a reference from which distance measurements of the external surface of the vehicle to the plane may be made.

DESCRIPTION OF PREFERRED EMBODIMENT

Figure 1:
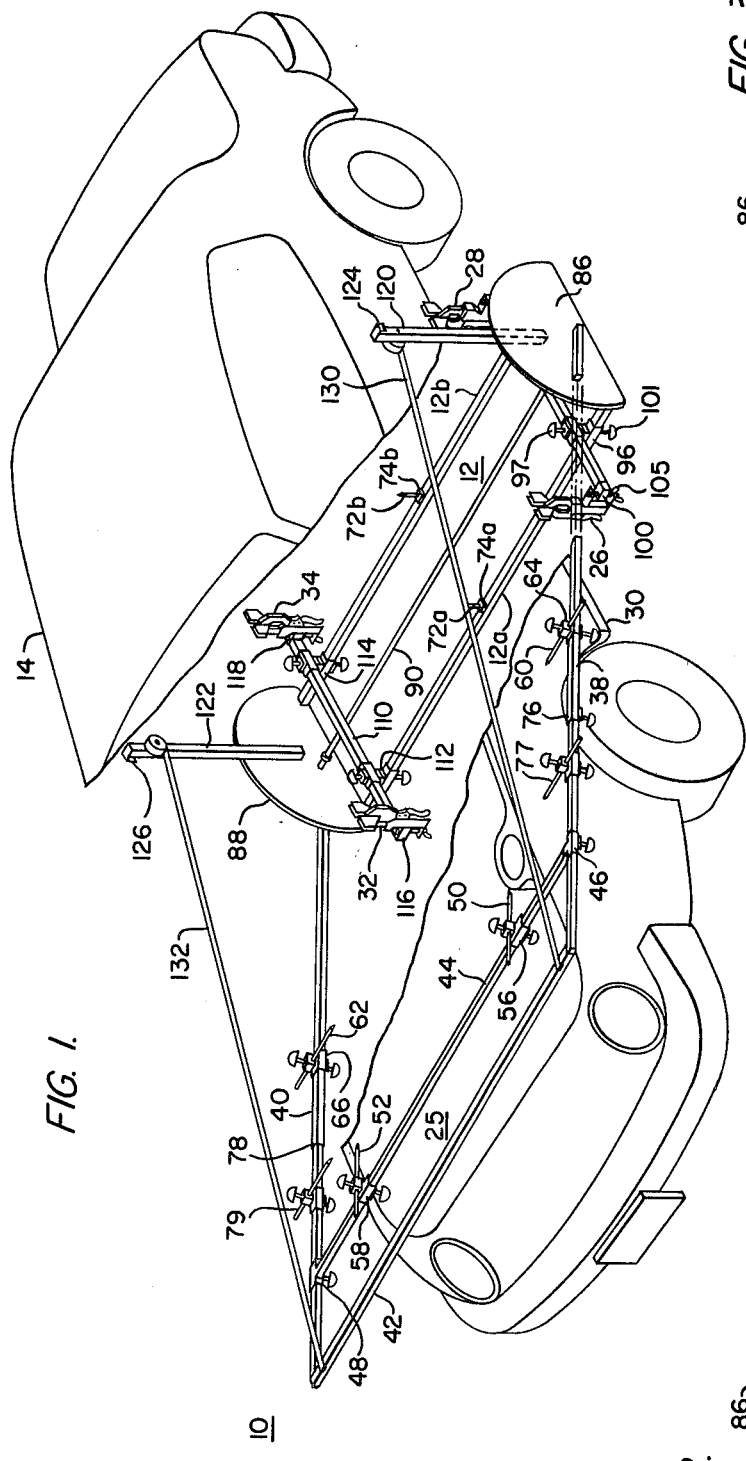
FIG. 1 is a perspective view of the alignment gauge according to the present invention.

In an exemplary embodiment of the present invention, as illustrated in FIG. 1, there is provided an improved alignment gauge, represented generally by the reference numeral 10, for aligning the frame, body and wheels of a damaged vehicle. The gauge 10 has a controlling member 12 comprising members 12a and 12b having a length greater than the width of the center portion of a vehicle 14. A device is provided for securing the controlling member 12 to the underside of the vehicle 14 so that the ends of the controlling member 12 extend beyond the sides of the vehicle 14. The device comprises clamp mechanisms 26 and 28 which are coupled to the rocker panel 30, and clamp mechanisms 32 and 34 which are coupled to the other rocker arm panel (not shown) of vehicle 14. These clamp mechanisms, preferably hand operated clamps, have the advantage of ease of insertion and removal. Also, affixing the controlling member 12 to the rocker panels 30 provides an undersurface which is easy to access. However, the invention contemplates other types of clamp mechanisms, including clamps using permanent magnets or electro-magnets. Also, other undersurfaces of the vehicle may be used as a location for affixing the controlling member 12 such as the factory holes (not shown) located on the undersurface of the vehicle 14.

Figure 2:
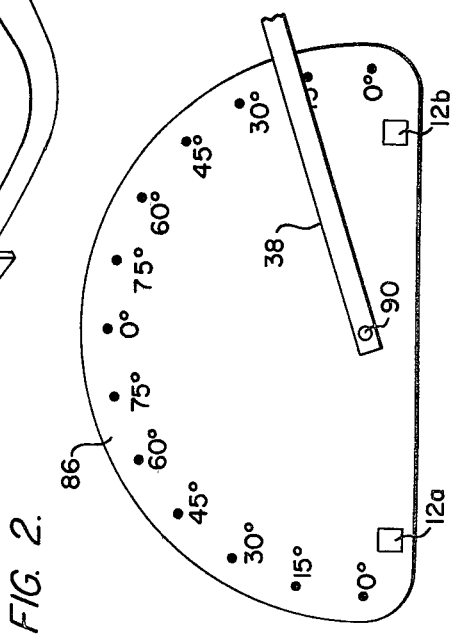
FIG. 2 is an external side view of the control plate assembly to illustrate control of the angular position of the rotatable datum plane for making measurements of the side and upper, as well as the lower, surfaces of the vehicle.
Figure 3:
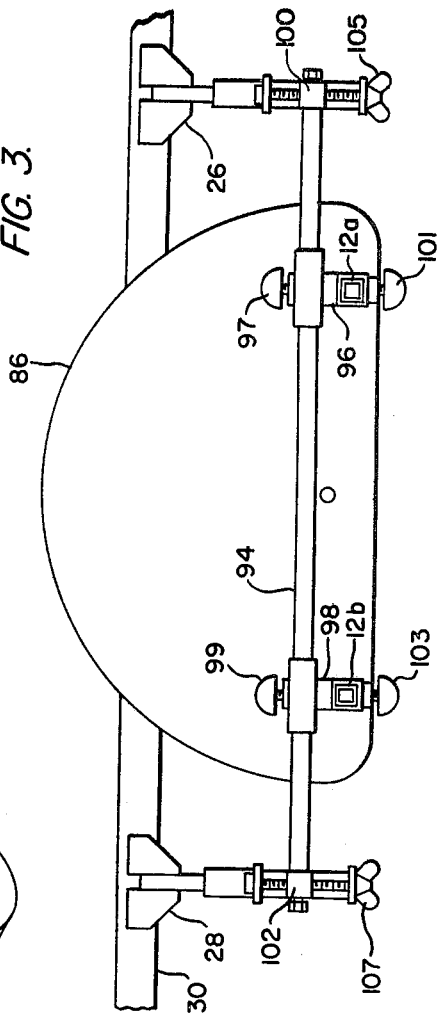
FIG. 3 is an internal side view of the control plate assembly to illustrate mounting of the alignement gauge of the present invention to the vehicle.

A rotatable measuring member, represented generally by reference numeral 25, has a pair of parallel side arms 38 and 40 having a length sufficient to permit the ends to extend beyond the front or back, as the case may be, of the vehicle 14. A transverse arm 42 is coupled to and extends between the upper ends of the side arms 38 and 40 and has a length at least equal to the width of the vehicle 14. A pair of control plates 86 and 88, one of which is shown in more detail in FIGS. 2 and 3, is provided for rotatively coupling the ends of the controlling member 12 to the lower ends of the side arms 38 and 40 of the rotatable measuring member 25. Through this action, the rotatable measuring member 25 may form a rotatable datum plane intersecting the center section of the vehicle 14 at a plurality of angles, with the plane forming a reference plane from which distance measurements of the external surface of the vehicle 14 to the plane may be made. In this manner comparative data between a damaged portion of the vehicle 14 and an undamaged, symmetrical portion may be obtained.

Gauge 10 has a slidable crossbar 44 which is slidably coupled between the side arms 38 and 40 of the rotatable measuring member 25. Couplers 46 and 48 permit crossbar 44 to be positioned along the length of the side arms 38 and 40. A pair of pointer members 50 and 52 are slidably coupled to the crossbar 44, through the use of couplers 56 and 58, so that any two comparable locations on the upper surface of the vehicle 14 may be dimensionally defined. The crossbar 44 preferably has dimensional indicia located thereon to accurately define the location of the pointer members 50 and 52 in the width direction of the vehicle 14. Also, the pointer members 50 and 52 preferably have dimensional indicia located thereon to accurately define the location of the ends of the pointers 50 and 52 in the direction towards the axis of rotation of the rotatable measuring member 25.

The gauge includes pointer members 60 and 62 which are slidably coupled to the side arms 38 and 40, respectively, so that locations on the side surfaces of the vehicle 14 may be dimensionally defined. These pointers are connected to the side arms by couplers 64 and 66. Preferably, the pointer members 60 and 62 have dimensional indicia located thereon to accurately define the location of the ends of the pointers in the direction parallel to the axis of rotation of the rotatable measuring member 25.

The side arms 38 and 40 of the rotatable measuring member 25 preferably have adjustable lengths to permit adjustment of distance between the crossbar 44 and the upper surface of the vehicle for any angular orientation of the rotatable measuring member 25. Telescoping assemblies 76 and 78 permit this adjustment of length. Additional pointers and couplers, illustrated generically by numerals 77 and 79, may be connected to the upper portions of arms 38 and 40, respectively.

Pointer members 72a and 72b are slidably coupled to the controlling members 12a and 12b, respectively, so that the location of the undersurface of the vehicle 14 may be dimensionally defined with respect to the controlling member 12. Couplers 74a and 74b connect the pointers to the controlling members. These pointer members also preferably have dimensional indicia located thereon.

Referring now to both FIGS. 1 and 2, there is illustrated the details of the manner of rotatively coupling the side arms of the rotatable measuring member 25 to the controlling member 12 so that the side arms may rotate with respect to the controlling member. Members 12a and 12b of controlling member 12 are located in matching openings formed in the control plates 86 and 88 as shown in FIG. 2. The plates 86 and 88 are perpendicular to the members 12a and 12b of the controlling member 12. Side arm 38 is pivotably coupled to plate 86, and side arm 40 is pivotably coupled to plate 88, the coupling being located on the control plates at the midpoint between the locations of the connection of the members 12a and 12b to the plates. The coupling of the side arms 38 and 40 to the respective control plates 86 and 88 is accomplished by a rod 90 extending from one side arm and associated control plate to the other as shown in FIG. 1. Suitable holes are formed in the control plates and side arms for receiving the rod 90. Conventional fasteners (not shown) located at each end of rod 90 hold the side arms and controlling member together as a unitary structure. Preferably, the plates are generally semicircular in shape and have angular indicia thereon to indicate the angular position of the rotatable measuring member 25 relative to the controlling member 12. The rotatable measuring member is capable of being rotated in excess of 180° with respect to the controlling member. Electric motors, not shown, may be affixed to the plates 86 and 88 to automatically and remotely control the proper positioning of the rotatable measuring member 25.

Referring now to both FIGS. 1 and 3, there is illustrated a device for adjusting the vertical, longitudinal and width positioning of the controlling member 12. As will be described later, it is important to be able to adjust the position of the control plates and the controlling member to compensate for any misalignment of the rocker panels. FIG. 3 is a view control plate 86 from the opposite side as that illustrated in FIG. 1. Members 12a and 12b are connected to a rod 94 by adjustable clamps 96 and 98, respectively. Screws 97 and 99 of clamps 96 and 98, respectively, adjust and set the desired position of the controlling member in the longitudinal direction and screws 101 and 103 of clamps 96 and 98, respectively, adjust and set the desired position of the controlling member in the width direction. The ends of rod 94 are connected to the rocker panel clamps 26 and 28 by adjustable couplers 100 and 102, respectively. Screws 105 and 107 of couplers 100 and 102, respectively, adjust and set the desired position of the controlling member in the vertical direction. FIG. 1 illustrates a similar arrangement with respect to three dimensional positioning of the ends of members 12a and 12b which are coupled to the control plate 88. More specifically, members 12a and 12b are connected to a rod 110 by adjustable clamps 112 and 114, respectively. The ends of rod 104 are connected to the rocker panel clamps 32 and 34 by adjustable couplers 116 and 118, respectively.

Referring again to FIG. 1, a device is provided for monitoring the orientation of the plane formed by the controlling members 12a and 12b. Preferably, this device includes vertically extending members 120 and 122 rigidly affixed to the plates 86 and 88, respectively, and plumb pointers 124 and 126 which are fixed to the upper portion of vertical members 120 and 122, respectively. The plumb pointers may be used to detect any misalignment of the controlling member 12 from a horizontal plane. Also, a device is provided for monitoring any angular misalignment between the side arms 38 and 40 of the rotatable measuring member 25. This may be carried out by the provision of steel tapes 130 and 132 affixed to the upper portion of the members 120 and 122, respectively, for measuring the distance between the top region of the vertical members 120 and 122 and the ends of the side arms, coupled to the transverse member 42.

Before describing the operation of the present invention, it is helpful to appreciate what happens to a vehicle when it is involved in an accident. The majority of the accidents are front end collisions to the passenger side; this is because vehicles mostly move in a forward direction and drivers try to avoid being hit on their side. For example, assume that a forward crash occurs with the vehicle moving straight ahead and that the vehicle hits a solid object on the passenger side. The bumper is pushed back on impact and and this shortens the right frame rail. A rail is a frame member extending from the center section of the vehicle to the front in a longitudinal direction. Suspension parts, radiator supports, fenders and bumpers are attached to the rail. The shortening of the rail upon impact is termed mash. Mash refers to a pleated or accordion-style effect of the rail. In addition to mash, the right rail typically will sag at the cowl, the cowl being the transverse metallic, fire wall section between the passenger compartment and the engine. The term sag refers to the downward bending of the rail as viewed from the side of the vehicle and results from the following factors. First, the rail is designed to have an elevational variation along its length; typically, the rail is 15" to 20" from the ground from the front to the cowl region and thereafter is 8" to 10" from the ground. Secondly, upon impact the momentum of the vehicle causes the rear of the vehicle to rise, thereby causing the sag. Moreover, the phenomenon termed twist will exist which refers to the right rail at the bumper being higher in elevation than the left rail. Also, since bumpers are made of heavy and stiff material, and since the right rail shortens upon impact, the left rail moves toward the right side of the vehicle. This condition is termed sway. Also, depending upon the severity of the accident, the left rail may move upwardly. This misalignment places the vehicle longitudinally out of datum. The term datum refers to an imaginary straight line running under the frame from the front to back along the underside plane of the vehicle in which each surface of the frame is a pre-determined distance from this line. The shortening of the right rail and the sway condition causes the forward section, meaning the region from the cowl to the bumper, to assume a diamond condition. The term diamond refers to the condition where the sides forming the corners of that section are no longer 90° from each other.

By viewing this damaged vehicle, an experienced person can observe that the right rail is short (mash), high (twist), down at the cowl (sag), that the right rail is shorter than the left rail (diamond), and that the vehicle is out of its horizontal plane (datum). However, merely by observation, a common method used in straightening cars today, one cannot tell by exactly how much the vehicle is bent.

The present invention permits exact three-dimensional measurements to determine how much mash, twist, sag, sway and diamond has occurred and how the datum line has been affected. The alignment gauge of the present invention is an outer perimeter measuring device. Once the gauge is in position, one can, by positioning the rotatable measuring member 25, visually observe and reference measure the exact extent of damage on a three-dimensional basis. Because vehicles are symmetrical and are built around datum planes, the invention defines these datum planes from which to make reference measurements. These datum planes are set up by the invention by using the center section of the vehicle as a beginning place of reference and placing the rotatable measuring member 25 over the vehicle at various angles.

The proper use and operation of the alignment gauge of the present invention will now be described. The first step is to visually check the center section of both rocker panel pinch welds to determine the extent of damage, if any, and to determine whether the pinch welds are bent in a fashion to make it impossible to clamp on the controlling member 12. If the pinch welds are so bent, they should be straightened enough to clamp on the controlling member 12. After any necessary pre-straightening of the rocker panel pinch welds, the controlling member 12 can be completely assembled with the exception of one of the control plates 86 and 88. The unassembled side of the controlling member 12 is then passed under the vehicle. A door edge may be used as a point of reference. The clamp mechanisms 26, 28, 32 and 34 are then attached to the rocker panels at the approximate center of the vehicle in the longitudinal direction. The previously unassembled control plate may now be fastened to the controlling member 12. Next, the adjustable screws 105 and 107 on the adjustable couplers 100, 102, 116 and 118 are adjusted to make the controlling member 12 be equally displaced from the undamaged underside of the corresponding left and right sides of the vehicle. The controlling members 12a and 12b farthest from the damaged portion of the vehicle should be adjusted first and then the member closest to the damage. After these adjustments, the controlling member 12 is at a height which is generally parallel to the underside 16 of the vehicle.

The next procedure pertains to front to back or longitudinal adjustments to place the control plates 86 and 88 parallel to the rocker panels. This procedure is accomplished by making a measurement from the controlling member 12b which is furthest from the damaged portion of the vehicle to a factory jig hole or weld seam and then properly locking the thumb screws on the adjustable clamps 98 and 114 which are coupled to member 12b. The same procedure must be done to the adjustable clamps 96 and 112 to properly set member 12a in the proper position in the longitudinal direction. Next, a side to side or width adjustment is made putting the control plates 86 and 88 an equal distance from the respective rocker panels or any other undamaged portions of the vehicle. This is done by taking a measurement from the rocker panels to the control plates or to undamaged underside portions of the vehicle and adjusting and locking the screws on the clamps 96, 98, 112 and 114 for equal displacement. Upon completion of these steps, twist in the center section of the vehicle may be detected. If the plumb pointers are at the same measurement on either side, then there is not twist in the center section of the vehicle. If they are different, the center section of the vehicle has twist. At this point, it is advisable to remove any twist from the vehicle and straighten the section, because all further measurements will be taken from the center section using the rotatable measuring member 25.

The rotatable measuring member 24 is now attached to the controlling member 12 via coupling to the control plates 86 and 88. By positioning the rotatable measuring member vertically, a reference measurement from the drip rails of the vehicle on the right and left sides permits determination whether there is damage in that roof section. By now positioning the rotatable measuring member 24 to the undamaged portion of the vehicle, the rear in this example, and in the same plane as members 12a and 12b, an additional check of proper gauge setup may be made. This is done by measuring both left and right side distances from the transverse arm 44 to a factory jig hole, weld seam, or other undamaged portion of the vehicle. If the measurements are identical on both sides of the vehicle, then the rotatable measuring member 24 may now be positioned to the damaged portion of the vehicle. Now, visual observations of the relationships between corresponding damaged and undamaged sections areas are used to guide in the straightening of the damaged vehicle. These observations are enhanced in accuracy and are shown three-dimensionally by the use of the various pointer members. Also, the tape measure is able to measure all of the vehicle body, frame and suspension parts.

The rotatable measuring member 24 is now brought to the front of the vehicle and locked in position so that the crossbar 44 is in the plane of the members 12a and 12b of the controlling member 12. Now, sway, twist and short rail may be visually and accurately noted. Measurements from the crossbar 44 indicate exactly how short the rail actually is. Measurements from side arms 38 and 40 indicate sway, how far the vehicle is to the right of center in this example. By adjustment of the couplers 46 and 48 so that crossbar 44 is under the bumper area of the frame, one can make a measurement for twist. Also, one can measure for datum or the height relationship throughout the vehicle. By sliding the couplers 46 and 48 to various positions, equally on both sides, one can find the extent of damage of the short rail, where the damage begins and ends, and to what degree. Also, by sliding the couplers 46 and 48 to the end of the side arms 38 and 40, rotatable measuring member 25 may be positioned to monitor the actual height and length of the radiator support, thereby ascertaining the extent of damage three-dimensionally in that area. By further shortening the rotatable measuring member 25 and positioning the pointers at the upper connecting area of the MacPherson Strut at the inner fender panel, the extent and degree of damage to that area may be ascertained on a three-dimensional basis. By further shortening the rotatable measuring member 25, the cowl section may be monitored to determine the extent of damage in this area. Now, knowing the extent of damage, the vehicle may be straightened by making pulls in the exact direction needed to straighten the vehicle.

The present invention may also be used to measure other parts of the vehicle to determine whether the vehicle is symmetrically balanced. For example, the wheels may be checked for bent rims, bent spindles or axles, tires being out of round and tread running off. Also, the invention may be used to determine whether suspension parts are bent, distorted or not in their proper location and to determine the state of front and rear wheel alignment and the alignment of distortion of a drive shaft.

In summary, the present invention has several applications owing to its accuracy, ease of use, economical manufacture, and to its inherent ability to compensate for user's lack of experience in knowing exactly how much a vehicle was damaged. The invention may be used as a teaching device, such as in trade schools, to educate people on what exactly happens to a vehicle when it is involved in an accident. Body shops and insurance companies may use the alignment gauge to write quick and accurate estimates of vehicle damage. The invention may also be used by insurance companies and motor vehicle departments to quickly verify the quality of body repair work. Lastly, the alignment gauge of the present invention may be used in auto body repair businesses for estimate writing, diagnosing extent of damage, training and repairing and checking a vehicle to verify that the vehicle was repaired correctly.

The embodiment of the present invention is intended to be merely exemplary and those skilled in the art may make numerous variations and modifications of it without departing from the spirit of the present invention. All such modifications and variations are intended to be included within the scope of the present invention as defined by the appended claims.

What is claimed is:
1. An alignment gauge for a vehicle comprising:
   a controlling member having a length greater than a width of the center portion of the vehicle;
   means for securing the controlling member to an underside of the vehicle so that ends of the controlling member extend beyond sides of the vehicle;
   a rotatable measuring member having a pair of parallel side arms and a transverse arm coupled to and extending between one end of each side arm and having a length at least equal to the width of the vehicle, and
   means for rotatively coupling the controlling member to the side arms of the rotatable measuring member so that the rotatable measuring member may define a rotatable datum plane intersecting a center region of the vehicle, the datum plane forming a reference from which distance measurements of portions of the vehicle to the plane may be made thereby to obtain information as to the damage done to the vehicle.
2. The gauge according to claim 1, further including means for adjusting a position of the controlling member with respect to the vehicle.
3. The gauge according to claim 1 further including a cross bar slidably coupled between the side arms of the rotatable measuring member and at least one pointer member slidably coupled to the cross bar so that locations on the upper surface of the vehicle may be dimensionally defined.
4. The gauge according to claim 3 wherein the cross bar has dimensional indicia thereon to accurately define the location of an end of the pointer in a direction parallel to an axis of rotation of the rotatable measuring member.
5. The gauge according to claim 1 further including:

a pointer member slidably coupled to each side arm so that any location on the side surface of the vehicle may be dimensionally defined.

6. The gauge according to claim 5 wherein the pointer members have dimensional indicia thereon to accurately define a location of an end of the pointer in a direction parallel to an axis of rotation of the rotatable measuring member.

7. The gauge according to claim 1 further including: a pointer member coupled to the controlling member so that a location of the underside of the vehicle may be dimensionally defined with respect to the controlling member.

8. The gauge according to claim 7 wherein the pointer member has dimensional indicia thereon.

9. The gauge according to claim 1 wherein the side arms of the rotatable measuring member include telescoping means for permitting adjustment of a distance between the transverse arm and an upper surface of the vehicle for various angular positions of the rotatable measuring member.

10. An alignment gauge for a vehicle including:
a controlling member having a pair of spaced, parallel members extending across a width of the vehicle,
a pair of means for securing the members to rocker panels of the vehicle, each securing means having a pair of clamps adapted to be attached to a seam of the rocker panel and means for coupling the members to the clamps, the clamps being adjustable in a vertical direction to vary a vertical elevation of the members relative to the rocker panels,
a rotatable measuring member having a pair of parallel side arms and a transverse arm extending between one end of the side arms, the transverse arm having a length greater than the width of the vehicle,
means for rotatively coupling the side arms of the rotatable measuring member to the controlling member, including a plate disposed perpendicular to and secured to ends of members of the controlling member, the side arms of the rotatable measuring member being pivotably secured to the plate.

11. The gauge according to claim 10 wherein the plate is generally semicircular in shape and has angular indicia therein to indicate an angular position of the rotatable measuring member relative to the controlling member.

12. The gauge according to claim 11 further including:
means for monitoring an orientation of the plane formed by the members of the controlling member.

13. The gauge according to claim 12 wherein the monitoring means include a vertically extending member rigidly affixed to the plate and a plumb pointer means affixed to an upper portion of the vertical member whereby any misalignment of the controlling member from a horizontal plane may be detected.

14. The gauge according to claim 11 further including:
means for monitoring any angular misalignment between the side arms of the rotatable measuring member.

15. The gauge according to claim 14 wherein the monitoring means includes a vertically extending member rigidly affixed to the plate and means for measuring a distance between a top region of the vertical member and end of the side member coupled to the transverse member.

16. An apparatus for detecting an extent of damage to a vehicle including:
a. a controlling member adapted to be disposed along a width of the vehicle at an underside thereof so as to extend beyond either side thereof,
b. means for securing the controlling member to rocker panels at each side of the vehicle,
c. means for adjusting a position of each side of the controlling member with respect to the vehicle so that the controlling member is symmetrical to the vehicle in longitudinal, width, and vertical directions,
d. means for defining a reference from which measurements of an upper external surface of the vehicle may be made, and
e. means for rotatively coupling the reference defining means to the controlling member so that the reference defining means defines a rotatable datum plate forming a reference from which distance measurements may be made to obtain information as to damage done to the vehicle.

17. The apparatus according to claim 16 wherein the controlling member includes a pair of spaced, parallel members having a length greater than the width of the vehicle and wherein the adjusting means includes:
a pair of rods, being disposed at opposite ends of the members and generally perpendicular thereto,
means connecting the rods to the members, and
means connecting the rods to the securing means.

18. The apparatus according to claim 17 wherein the means connecting the rods to the members includes:
means for adjusting and setting a position of the members in a direction parallel to a length dimension of the members and
means for adjusting and setting a position of the members in a direction parallel to a length dimension of the rods.

19. The apparatus according to claim 18 further including means for adjusting and setting a position of the rods in a direction perpendicular to length dimensions of the members and the rods, thereby to control a vertical positioning of the member with respect to the underside of the vehicle.

20. An apparatus for detecting an extent of damage to a vehicle including:
a. a controlling member adapted to be disposed along a width of of the vehicle at an underside thereof so as to extend beyond either side thereof, the controlling member includes a pair of spaced, parallel members having a length greater than a width of the vehicle,
b. means for securing the controlling member to rocker panels at each side of the vehicle,
c. means for adjusting a position of each side of the controlling member with respect to the vehicle so that the controlling member is symmetrical to the vehicle in longitudinal, width and vertical directions, the adjusting means including a pair of rods disposed at opposite ends of the members and generally perpendicular thereto, means for connecting the rods to the members, and means connecting the rods to the securing means, and
d. means coupled to the controlling member for defining a reference from which measurements of an upper external surface of the vehicle may be made, the reference defining means includes means rotatively coupled to each side of the controlling member so as to extend around sides and upper surfaces of the vehicle.

21. An apparatus for detecting damage to a vehicle including,
- means connected to a vehicle for defining a first reference from which measurements of symmetrical portions of a vehicle may be made, the first reference defining means being adapted to be disposed along an undersurface of the vehicle at an undamaged portion thereof,
- measuring means for defining a second reference at the upper surface of the vehicle, and
- means for rotatively coupling said measuring means to said first reference defining so that the first reference defining means forms a rotatable datum plane defining a reference from which distance measurements of portions of the vehicle to the datum plane may be made to determine an extent of vehicle damage.

22. An alignment gauge for a vehicle comprising:
- a controlling member adapted to be mounted on an underside of the vehicle, the controlling member having a length greater than a width of a center portion of the vehicle so that ends of the controlling member extend beyond sides of the vehicle;
- a rotatable measuring member having a pair of parallel side arms and a transverse arm coupled to and extending between one end of each side arm and having a length at least equal to the width of the vehicle, and
- means for rotatively coupling the controlling member of the side arms of the rotatable measuring member so that the rotatable measuring member may define a rotatable datum plane intersecting a center region of the vehicle, the datum plane forming a reference from which distance measurements of portions of the vehicle to the plane may be made thereby to obtain information as to damage done to the vehicle.

23. An alignment gauge for a vehicle including:
- a controlling member having a pair of spaced, parallel members extending across a width of the vehicle,
- a rotatable measuring member having a pair of parallel side arms and a transverse arm extending between one end of the side arms, the transverse arm having a legnth greater than the width of the vehicle,
- means for rotatively coupling the side arms of the rotatable measuring member to the controlling member including a plate disposed perpendicular to and secured to ends of the members of the controlling member, the side arm of the rotatable measuring member being pivotably secured to the plate.

24. An apparatus for detecting an extent of damage to a vehicle including:
- a controlling member adapted to be disposed along a width of the vehicle at an underside thereof so as to extend beyond either side thereof,
- means for adjusting a position of each side of the controlling member with respect to the vehicle so that the controlling member is symmetrical to the vehicle in longitudinal, width and vertical direction,
- means for defining a reference from which measurements of an upper external surface of the vehicle may be made including means rotatively coupled to each side of the controlling member so as to extend around sides and upper surfaces of the vehicle.

* * * * *